April 2, 1929.  B. H. TER BEEST  1,707,692
VALVE FOR WATER SOFTENERS OR THE LIKE
Filed Dec. 1, 1927   2 Sheets-Sheet 1

April 2, 1929.　　B. H. TER BEEST　　1,707,692
VALVE FOR WATER SOFTENERS OR THE LIKE
Filed Dec. 1, 1927　　2 Sheets-Sheet 2
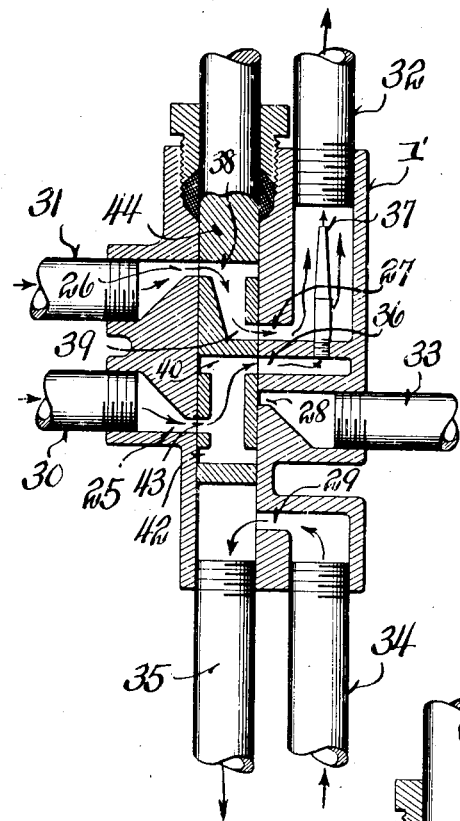
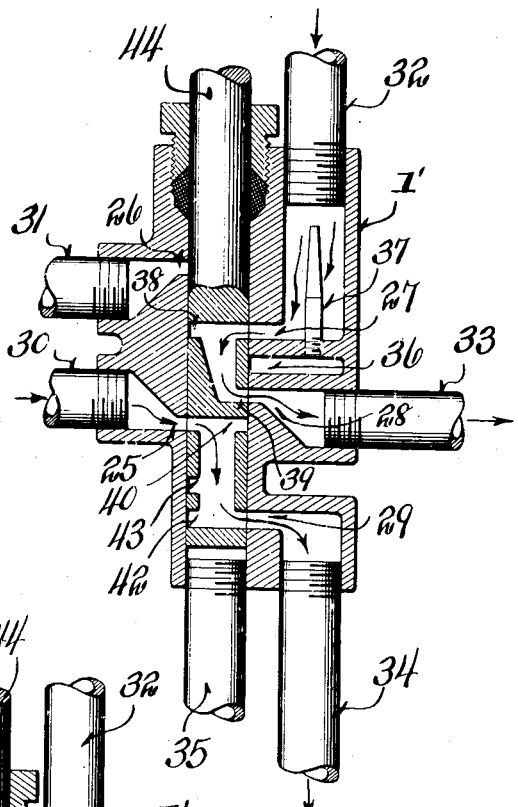
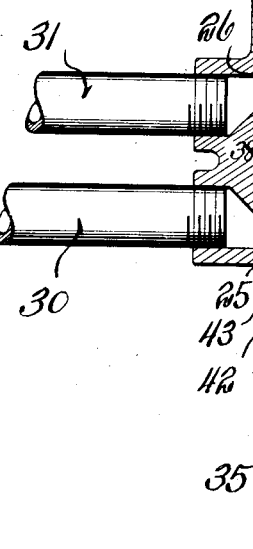

Patented Apr. 2, 1929.

1,707,692

UNITED STATES PATENT OFFICE.

BENJAMIN H. TER BEEST, OF MADISON, WISCONSIN.

VALVE FOR WATER SOFTENERS OR THE LIKE.

Application filed December 1, 1927. Serial No. 236,953.

This invention relates to water softeners, and is particularly directed to a valve for the water softener.

Objects of this invention are to provide a valve which is so constructed that it requires no skill on the part of the operator to perform the successive operations of passing the salt through the mineral, allowing it to soak, and subsequently washing and reconnecting the parts in their normal condition.

Further objects are to provide a valve which is of extreme simplicity, which has essentially one main moving part, which may be conveniently operated by a hand lever, and which makes all of the desired connections to accomplish a thorough rejuvenation of the mineral.

A further object of this invention is to provide a novel form of valve in which complete and perfect sealing is assured, irrespective of wear of the valve, and in which a yielding contact is maintained between gaskets and the seats adjacent the brine supply and the waste pipe, so that no possible leak can occur.

A further object of this invention is to provide a valve for water softeners in which a single direct boring operation may be performed for forming the main portion of the valve body, and in which the valve itself may be of simple cylindrical construction.

Embodiments of the invention are shown in the accompanying drawings in which:

Figure 2 is a sectional view showing a modified form of valve in the position for supplying brine;

Figure 3 is a view of the valve shown in Figure 2 showing it in normal position;

Figure 4 is a view of the valve shown in Figure 2 showing it in the completely closed position in which all ports are closed.

Figure 1:
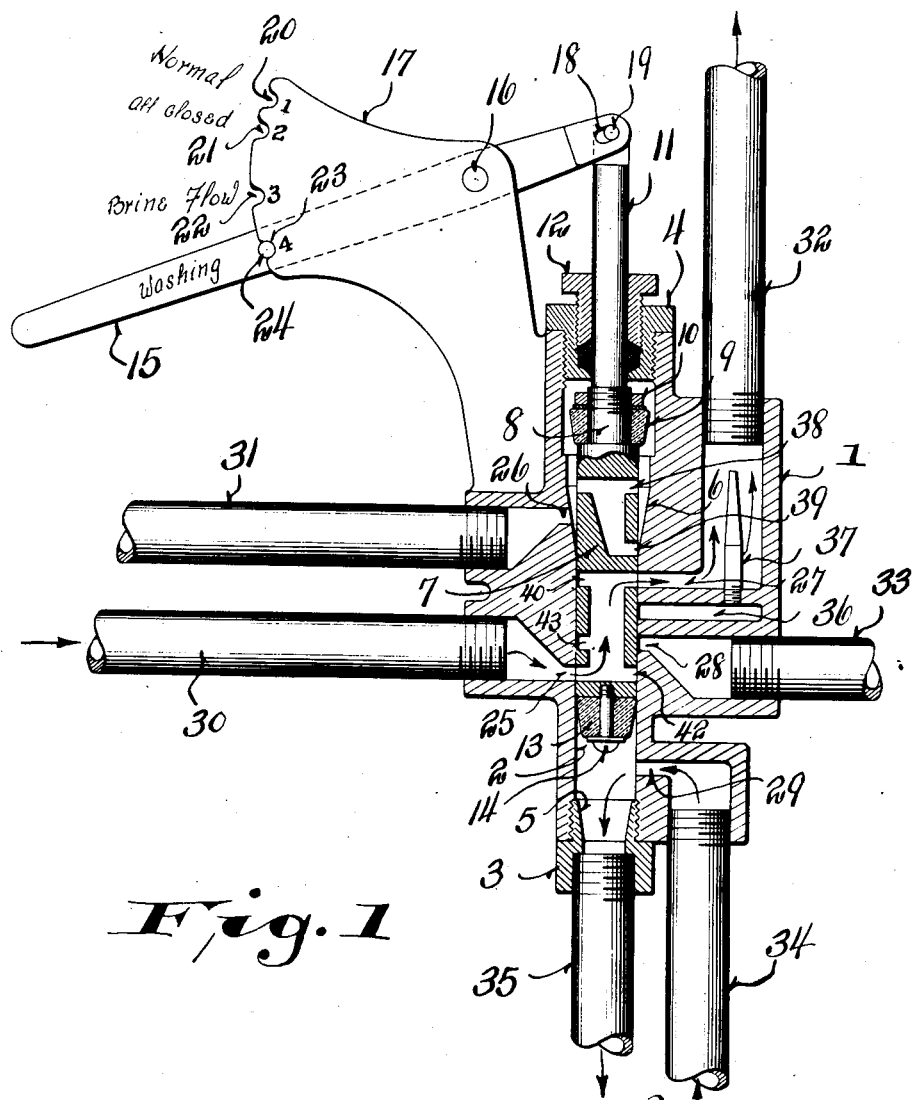
Figure 1 shows one form of the valve showing it in the washing process, such view being partly in section.

Referring to the drawings, particularly Figure 1, it will be seen that the valve consists of a body portion 1 provided with a cylindrical bore or passageway 2 therethrough. This passageway is open from one end to the other and fittings 3 and 4 are screwed into the upper and lower ends of this passageway. It is to be noted that the fitting 3 is provided with a bevel or conical inner surface 5 and that the upper portion of the body 1 adjacent the upper end of the bore 2 is also bevelled, as indicated at 6. The purpose of these bevelled portions will appear.

The valve proper consists of a cylindrical member 7 which accurately fits the cylindrical aperture or bore 2. This cylindrical member may be provided with a reduced portion 8 adjacent its upper end, and a ring-like Fuller ball or gasket 9 may be positioned about such portion 8 and locked in place by means of the nut 10. From this point, a valve stem 11 projects upwardly through a suitable packing and packing gland 12. The lower end of the valve is provided with a second gasket 13 or Fuller ball held in place by means of a screw 14, or, if desired, in any other suitable manner.

It is to be noted that both the gaskets 9 and 13 have conical outer surfaces and that these conical surfaces seal against the conical faces 6 and 5 when the valve is in its lowest position, which corresponds to the normal operation of the water softener.

Any desired means may be employed for operating the valve, but preferably, a somewhat springy manipulating lever or arm 15 is provided and pivoted as indicated at 16 to a segmental plate or bracket 17. The end of the arm adjacent the valve stem is slotted, as indicated at 18 and receives the pin 19 carried by the valve stem. Preferably, this portion of the lever is forked to provide a better attachment to the valve stem.

The outer face of the segmental plate 17 is provided with a series of notches 20, 21, 22, and 23. These notches are adapted to receive a short stud or pin 24 carried by the lever 15.

In operating the device, the lever is sprung laterally a slight amount to free the pin from the notch and thereafter the lever is rocked to the desired position and the pin 24 is allowed to again snap into the appropriate notch.

Returning to the valve body, it will be seen that the body is provided with a plurality of ports 25, 26, 27, 28, and 29, which open into the cylindrical passageway 2. These ports 25 to 29 communicate respectively with the hard water supply pipe 30, the brine supply pipe 31, a pipe 32, leading to the upper portion of the softener tank, a delivery pipe 33 for the soft water, and a pipe 34 leading to the lower end of the softener tank. Further, the fitting 3 receives the waste pipe 35.

It is to be noted also that the body of the valve is provided with an aperture or port 36 which, under normal conditions, is cut off from the remainder of the openings. It is provided with a nozzle 37 communicating therewith and projecting upwardly directly in line with the pipe 32 leading to the upper portion of the tank.

The valve is provided adjacent its upper end with a transverse port 38 which communicates with a laterally extending port 39. Further, about centrally of the valve, a port 40 extends completely across the valve and communicates both with a similar port 42 and with a laterally extending port 43.

By manipulating the handle 15, or lever, the successive ports are caused to register with the ports in the cylinder or body portion of the valve within which the cylindrical valve slides, so that the device allows hard water to pass to the lower portion of the tank and to discharge from the upper portion to the supply pipe under normal conditions or to permit the entrance of brine and passage thereof through the tank, or to wash the tank by causing a flow of water therethrough to the waste pipe. These different positions will be shown in connection with the modified form to avoid a needless duplication of views.

In the form shown in Figures 2, 3, and 4, identically the same arrangement of ports, pipes, body portion and valve structure proper is employed, the valve being indicated in such views by the reference character 44, and the same numerals being employed to indicate the ports in the valve and in the body portion as those heretofore used. This form of the invention differs from that previously described only in that there are no gaskets carried at the ends of the valve, but instead the valve continues outwardly as a cylinder. It is operated in identically the same manner. It is therefore clear that the several successive positions can be readily seen from Figures 1 to 4, for both forms of the valve.

The normal position of the parts is shown in Figure 3. The hard water flows from the pipe 30 through the port 25 into the port 40 of the valve. From this point, the water flows through the port 42 of the valve, through the port 29 of the body portion, into the pipe 34, and passes to the bottom of the tank. The water from the upper portion of the tank passes from the pipe 32 through the port 27 of the body portion, through the port 38 of the valve, and from thence through the port 39 of the valve, through the port 28 of the body portion to the soft water delivery pipe 33. This is the normal position of the parts, and corresponds to the position of the lever in which the pin 24 seats within the notch 20. The notches formed in the plate 17 are indicated in any suitable manner on the actual machine, for example, by the numbers 1, 2, 3, and 4, to indicate the positions.

When the lever is removed to the brine flow position corresponding to the notch 22, the parts are in the position shown in Figure 2. Hard water passes from the pipe 30 through the ports 43 of the valve and from thence through the port 40 of the valve to the port 36 of the body portion. This water is under pressure and squirts upwardly through the nozzle 37, thus producing a suction through the port 39 and through the port 38 of the valve. The port 38 is in communication with the port 26 leading to the brine supply pipe 31. Consequently, brine is entrained and is forced upwardly through the pipe 32 to the upper portion of the tank. The pipe 34 from the lower end of the tank is placed in communication with the waste pipe 35 through the port 29, which has been uncovered, as shown in Figure 2, as the valve has moved upwardly out of the way.

After brine has flowed a sufficient length of time, the lever may be moved to the position corresponding to the notch 21. The parts are then in the position shown in Figure 4, and it will be seen that all passageways are closed. This corresponds to the soaking period in which the brine carried into the tank is allowed to thoroughly permeate or soak all portions of the mineral.

When it is desired to wash the mineral, the lever is moved to its lowest position, as shown in Figure 1. The hard water now passes from the pipe 30 through the port 25 of the body portion, through the port 42 of the valve, and from thence through the port 40 of the valve, and through the port 27 of the body portion to the pipe 32 leading to the top of the tank. The water from the pipe 34 from the lower end of the tank passes through the port 29 to the waste pipe 35.

After washing has progressed for a predetermined length of time, the lever is again swung to its extreme or uppermost position, thus reestablishing the connection, as shown in Figure 3, in which the supply water from the pipe 30 passes to the pipe 34 to the lower end of the tank, and the softened water passes from the pipe 32 from the upper end of the tank to the delivery pipe 33.

It will be seen, therefore, that an extremely simple and easily produced valve has been provided which is so constructed that it makes all of the desired connections for rejuvenating, washing, and soaking operations, as well as for the normal operation of the softener.

Further, it will be seen that the valve can be very readily constructed by ordinary processes and that it lends itself admirably to simple machine shop processes of construction.

In the preferred form, as shown in Figure 1, gaskets 9 and 13 seal the salt entrance aperture and the waste pipe aperture in a yielding manner, in addition to the sealing secured by the cylindrical valve structure. This gives added security and is the normal position of the parts.

It is to be noted also that the valve may be readily removed by removing the fitting 4 and withdrawing the valve upwardly from the device.

Further, it will be seen that it is an easy matter to clean any sediment that may accumulate in the valve.

Although the invention has been described in considerable detail, such description is intended as illustrative rather than limiting as the invention may be variously embodied and as the scope of such invention is to be determined as claimed.

It is to be understood that the expressions "brine port", "soft water port", "waste port", and "supply port", as appearing in the claims, are used for conciseness to avoid needless repetitions and indefinite statements, and are not to be interpreted as limiting.

I claim:

1. A valve for a water softener comprising a body portion provided with a cylindrical valve receiving aperture therethrough, a valve slidable in said aperture, said body portion having a port, and a second port and having a supply port, a brine port, a soft water port and a waste port, said valve having transverse ports arranged in groups with the ports in each group communicating with each other and distinct from the ports of the other groups, said valve in one position establishing communication between the brine port and the first mentioned port and between the second mentioned port and the waste port, and in another position establishing communication between said supply port and said second port and between said first mentioned port and said soft water port.

2. A valve for a water softener comprising a body portion provided with a cylindrical valve receiving aperture, a valve slidable in said aperture, said body portion having a port, a second port, a supply port, an outlet port, and a waste port, said valve having transverse ports adapted to align with the ports in said body portion, said valve in one position establishing communication between said supply port and said second port and between said first mentioned port and said outlet port, and in another position establishing communication between said supply port and said first mentioned port and between said second port and said waste port.

3. A valve for a water softener comprising a body portion provided with a cylindrical valve receiving aperture, a valve slidable in said aperture, said body portion having a port, a second port, a supply port, an outlet port, and a waste port, said valve having transverse ports adapted to align with the ports in said body portion, said valve in one position establishing communication between said supply port and said second port and between said first mentioned port and said outlet port, and in another position establishing communication between said supply port and said first mentioned port and between said second port and said waste port, said waste port having a valve seat formed therein and said valve having a closure member cooperating with said valve seat to seal said waste port when said valve is in the first mentioned position.

4. A valve for a water softener comprising a body portion having a cylindrical aperture, a cylindrical valve slidable in said aperture, said body portion having a port, a second port, a supply port, an outlet port, a brine port, and a waste port, said valve having transverse apertures adapted to communicate with said ports, said body portion having an auxiliary port, a nozzle communicating with said auxiliary port and projecting into said first mentioned port, said valve in one position establishing communication between said supply port and said second port and between said first port and said outlet port, and in another position establishing communication between said supply port and said auxiliary port, between said brine port and said first mentioned port, and between said second port and said waste port.

In testimony that I claim the foregoing I have hereunto set my hand at Madison, in the county of Dane and State of Wisconsin.

BENJAMIN H. TER BEEST.